United States Patent
Moriguchi et al.

(10) Patent No.: US 7,950,484 B2
(45) Date of Patent: May 31, 2011

(54) ELECTRICALLY DRIVEN WHEEL AND VEHICLE

(75) Inventors: Naoki Moriguchi, Susono (JP); Michitaka Tsuchida, Susono (JP); Ryoji Mizutani, Nishikamo-gun (JP); Junichiro Sakurai, Chiryu (JP); Yuki Tojima, Chita-gun (JP)

(73) Assignees: Toyota Jidosha Kabushiki Kaisha, Toyota (JP); Aisin Seiki Kabushiki Kaisha, Kariya (JP)

( * ) Notice: Subject to any disclaimer, the term of this patent is extended or adjusted under 35 U.S.C. 154(b) by 758 days.

(21) Appl. No.: 11/887,820

(22) PCT Filed: Apr. 12, 2006

(86) PCT No.: PCT/JP2006/308167
§ 371 (c)(1),
(2), (4) Date: Oct. 4, 2007

(87) PCT Pub. No.: WO2006/115132
PCT Pub. Date: Feb. 11, 2006

(65) Prior Publication Data
US 2009/0025991 A1    Jan. 29, 2009

(30) Foreign Application Priority Data
Apr. 22, 2005  (JP) ................................ 2005-125298

(51) Int. Cl.
*B60K 7/00*  (2006.01)
(52) U.S. Cl. ..................................... 180/65.51; 180/65.6
(58) Field of Classification Search ................. 180/65.1, 180/65.51, 65.6; 188/18 R
See application file for complete search history.

(56) References Cited

U.S. PATENT DOCUMENTS

| | | | |
|---|---|---|---|
| 3,892,300 A | | 7/1975 | Hapeman et al. |
| 4,330,045 A | | 5/1982 | Myers |
| 5,014,800 A | * | 5/1991 | Kawamoto et al. ........ 180/65.51 |
| 5,118,165 A | * | 6/1992 | Latvala ........................ 303/9.76 |
| 5,246,082 A | * | 9/1993 | Alber ......................... 180/65.51 |
| 5,458,402 A | * | 10/1995 | Jeffery ............................ 303/13 |
| 6,341,539 B1 | * | 1/2002 | Tsuda ............................. 74/529 |
| 6,907,963 B1 | * | 6/2005 | Brown et al. ............... 188/73.31 |
| 6,942,072 B2 | * | 9/2005 | Klode et al. .................. 188/164 |
| 6,942,075 B2 | * | 9/2005 | Buckley et al. ............... 188/359 |

(Continued)

FOREIGN PATENT DOCUMENTS

DE    1 680 169    10/1971

(Continued)

OTHER PUBLICATIONS

Dec. 14, 2010 Office Action issued in Japanese Patent Application No. 2005-125298 with English Translation.

*Primary Examiner* — Frank B Vanaman
(74) *Attorney, Agent, or Firm* — Oliff & Berridge, PLC

(57) ABSTRACT

An electrically driven wheel includes a wheel disc and a wheel hub; an in-wheel motor mounted within the wheel disc to drive the wheel disc and the wheel hub or to be driven by the wheel disc and the wheel hub; a brake rotor and a brake caliper suppressing rotation of the wheel disc and the wheel hub while a vehicle is moving; and a parking lock mechanism provided in the in-wheel motor separately from a brake mechanism formed of the brake rotor and the brake caliper. The parking lock mechanism is a band-type brake frictionally engaging a planetary carrier serving as an "output portion" of a "reduction mechanism".

8 Claims, 4 Drawing Sheets

U.S. PATENT DOCUMENTS 7,350,606 B2 * 4/2008 Brill et al. .................. 180/65.51
2005/0245341 A1 11/2005 Mueller et al.

FOREIGN PATENT DOCUMENTS

| EP | 1 560 315 A2 | 8/2005 |
| FR | 2 131 643 | 11/1972 |
| JP | A-50-043632 | 4/1975 |
| JP | A-05-338446 | 12/1993 |
| JP | A-09-109696 | 4/1997 |
| JP | A 9-295561 | 11/1997 |
| JP | A 2002-104160 | 4/2002 |

* cited by examiner

ELECTRICALLY DRIVEN WHEEL AND VEHICLE

TECHNICAL FIELD

The present invention relates to an electrically driven wheel and a vehicle, and more particularly, to an electrically driven wheel and a vehicle having a parking lock mechanism.

BACKGROUND ART

A parking brake to lock a wheel while a vehicle is in a parking state has conventionally been known.

For example, Japanese Patent Laying-Open No. 2002-104160 discloses a brake unit used in a drive wheel of an electric car employing an in-wheel motor, in which a brake applied while the car is moving and a parking brake are integrated.

Further, Japanese Patent Laying-Open No. 09-295561 discloses a parking lock unit for an automatic transmission.

However, when a brake mechanism used while a vehicle is moving and a parking brake mechanism are integrated as described in Japanese Patent Laying-Open No. 2002-104160, the vehicle may move when a brake failure occurs.

Further, from a viewpoint different from the above, an electrically driven wheel having an in-wheel motor tends to have an increased temperature within the wheel. Accordingly, in terms of improving heat radiating property, it is preferable to use a disc brake. On the other hand, using a disc brake as a parking lock mechanism leads to an increase in the size of a unit.

DISCLOSURE OF THE INVENTION

One object of the present invention is to provide an electrically driven wheel and a vehicle having a parking lock mechanism capable of locking a wheel reliably with a simple structure.

An electrically driven wheel in accordance with the present invention includes a wheel, an in-wheel motor having at least a portion thereof mounted within the wheel to drive the wheel or to be driven by the wheel, a brake mechanism suppressing rotation of the wheel while a vehicle is moving, and a parking lock mechanism provided in the in-wheel motor separately from the brake mechanism.

With the above arrangement, since the parking lock mechanism is provided separately from the brake mechanism, the parking lock mechanism can lock the wheel reliably. Further, since the parking lock mechanism is provided in the in-wheel motor, an increase in the size of a unit can be suppressed.

Preferably, in the electrically driven wheel, the in-wheel motor has a reduction mechanism, and the parking lock mechanism fixes an output portion in the reduction mechanism.

With the above arrangement, the parking lock mechanism can lock the wheel reliably while suppressing an increase in the size of a unit.

Preferably, in the electrically driven wheel, the parking lock mechanism is a band-type brake frictionally engaging the output portion in the reduction mechanism.

With the above arrangement, a relatively large friction area can be obtained, and thus the wheel can be locked reliably by the parking lock mechanism with a simple structure.

In the above electrically driven wheel, in one aspect, the brake mechanism is disposed between the wheel and the in-wheel motor in a direction of a rotary shaft of the in-wheel motor, and the parking lock mechanism is disposed on a side of a stator coil of the in-wheel motor opposite to the brake mechanism in the direction of the rotary shaft of the in-wheel motor.

With the above arrangement, a parking lock mechanism capable of locking a wheel reliably while suppressing an increase in the size of a unit can be obtained.

In the above electrically driven wheel, in one aspect, the in-wheel motor has a cylindrical portion extending parallel to the direction of the rotary shaft thereof. With this arrangement, the wheel can be locked by fixing the cylindrical portion.

A vehicle in accordance with the present invention includes a plurality of the electrically driven wheels described above. Preferably, the parking lock mechanisms in the plurality of the electrically driven wheels are each connected to a shift cable and operated simultaneously in response to movement of the shift cable.

The above arrangement allows a plurality of the parking lock mechanisms to be operated simultaneously in response to the movement of the shift cable, locking the plurality of wheels simultaneously.

According to the present invention, an electrically driven wheel having a parking lock mechanism capable of locking a wheel reliably with a simple structure can be provided as described above.

BEST MODES FOR CARRYING OUT THE INVENTION

Figure 1:
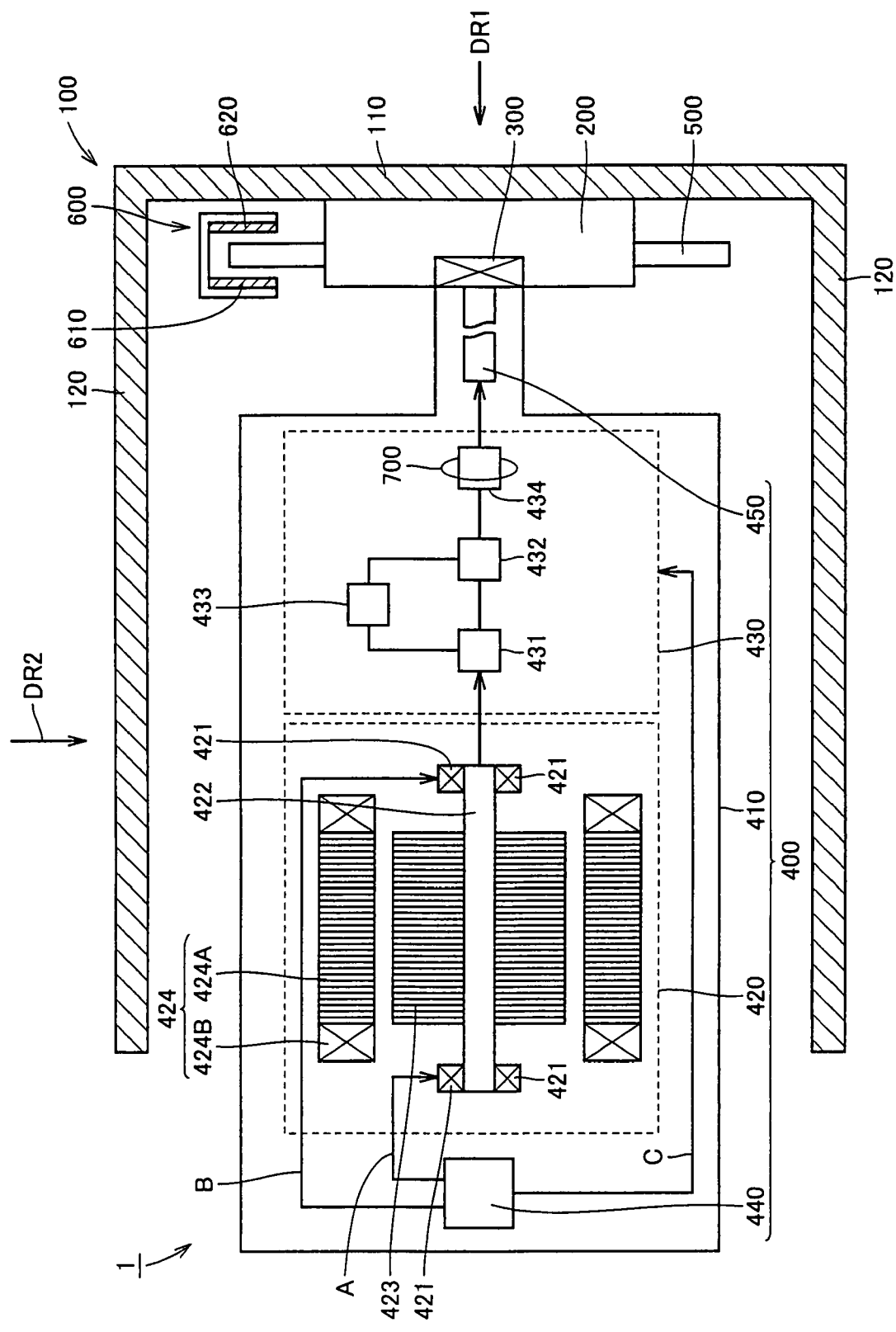
FIG. 1 is a block diagram showing an arrangement of an electrically driven wheel included in a vehicle in accordance with one embodiment of the present invention.

Hereinafter, an embodiment of an electrically driven wheel and a vehicle in accordance with the present invention will be described. In the description below, identical reference numerals refer to identical or corresponding parts, and a detailed description thereof may not be repeated.

FIG. 1 is a block diagram showing an arrangement of an electrically driven wheel included in a vehicle in accordance with one embodiment of the present invention. Referring to FIG. 1, an electrically driven wheel 1 has a wheel disc 100, a wheel hub 200, a joint 300, an in-wheel motor 400, a brake rotor 500, a brake caliper 600, a parking lock mechanism 700, and a tire (not shown).

In-wheel motor 400 includes a case 410, a motor 420, a planetary gear 430 serving as a reduction mechanism, an oil pump 440, and a shaft 450.

Wheel disc 100 is substantially shaped like a cup, and has a disc portion 110 and a rim portion 120. The tire (not shown) is fixed on the outer edge of rim portion 120 of wheel disc 100. Wheel disc 100 is formed to accommodate wheel hub 200, a portion or whole of in-wheel motor 400, brake rotor 500, and brake caliper 600. Wheel disc 100 is assembled to the vehicle from a direction indicated by an arrow DR1, and coupled with wheel hub 200 by fastening disc portion 110 to wheel hub 200 with a hub bolt.

Wheel hub 200 is coupled to shaft 450 of in-wheel motor 400 via joint 300.

Brake rotor 500 is disposed such that its inner peripheral end is fixed to an outer peripheral end of wheel hub 200 and its outer peripheral end passes through within brake caliper 600. Brake caliper 600 includes a brake piston and brake pads 610 and 620. Brake pads 610 and 620 sandwich the outer peripheral end of brake rotor 500.

When brake oil is supplied to brake caliper 600, the brake piston moves to the right side of the drawing, pushing brake pad 610 to the right side of the drawing. In response to brake pad 610 moving to the right side of the drawing, brake pad 620 moves to the left side of the drawing. Thereby, brake pads 610 and 620 sandwich the outer peripheral end of brake rotor 500 to brake electrically driven wheel 1.

Next, an arrangement of in-wheel motor 400 will be described.

Case 410 is disposed on the left side of wheel hub 200 in the drawing, accommodating motor 420, planetary gear 430, oil pump 440, shaft 450, and an oil channel.

Motor 420 has a bearing 421, a rotary shaft 422, a rotor 423, and a stator 424. Stator 424 includes a stator core 424A and a stator coil 424B. Stator core 424A is fixed to case 410. Stator coil 424B is wound on stator core 424A. When motor 420 is a three-phase motor, stator coil 424B is formed of a U-phase coil, a V-phase coil, and a W-phase coil. Rotor 423 is disposed on the inner peripheral side of stator core 424A and stator coil 424B.

Planetary gear 430 includes a sun gear 431, a pinion gear 432, a ring gear 433, and a planetary carrier 434.

A sun gear shaft (not shown) is coupled to rotary shaft 422 of motor 420. Further, the sun gear shaft is rotatably supported. Sun gear 431 is coupled to the sun gear shaft. Pinion gear 432 engages sun gear 431 and is rotatably supported. Ring gear 433 is fixed to case 410. Planetary carrier 434 is coupled to pinion gear 432. Further, planetary carrier 434 is splined and engaged to shaft 450. Further, planetary carrier 434 is rotatably supported.

Oil pump 440 pumps up oil in an oil pan, and supplies the pumped oil to the oil channel (not shown).

When a switching circuit (not shown) mounted in the vehicle supplies an alternating current to stator coil 424B, rotor 423 rotates and motor 420 outputs a predetermined torque. The output torque of motor 420 is transferred to planetary gear 430 via the sun gear shaft. Planetary gear 430 changes the output torque received from the sun gear shaft using sun gear 431 and pinion gear 432, that is, alters (reduces) the speed, for output to planetary carrier 434. Planetary carrier 434 transfers the output torque of planetary gear 430 to shaft 450, and shaft 450 rotates wheel hub 200 and wheel disc 100 via joint 300 at a predetermined number of revolutions. Thereby, electrically driven wheel 1 rotates at a predetermined number of revolutions.

On the other hand, oil pump 440 pumps up the oil from the oil pan, and supplies the pumped oil to the oil channel as described above. The oil entering the oil channel is supplied for example to bearing 421 and planetary gear 430 along arrows A, B, and C to lubricate them. Further, the oil cools stator coil 424B and the like.

Parking lock mechanism 700 is disposed within case 410 of in-wheel motor 400 on a side of stator coil 424B opposite to brake rotor 500. Parking lock mechanism 700 locks planetary carrier 434 in planetary gear 430.

Figure 2:
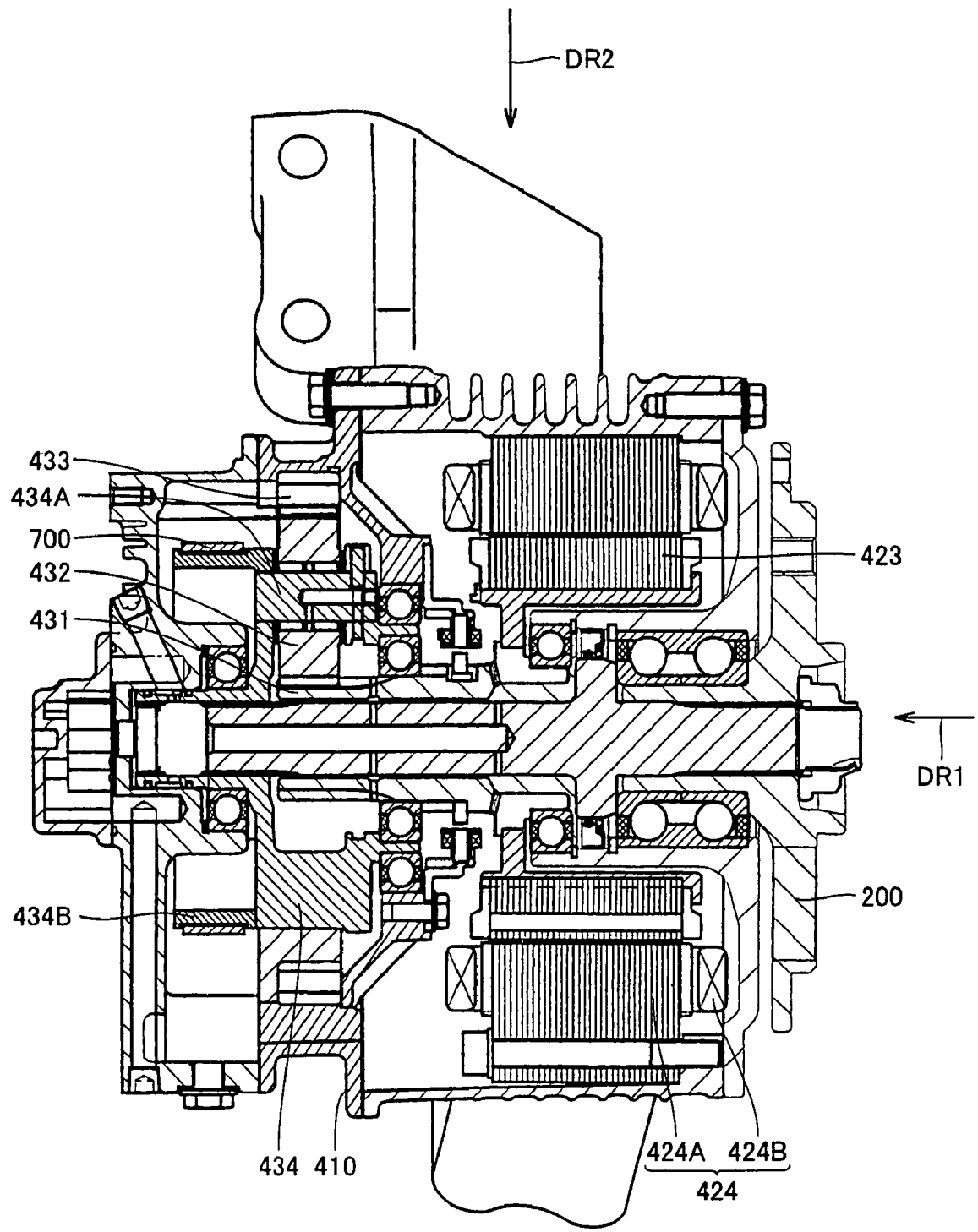
FIG. 2 is a cross sectional view of an in-wheel motor shown in FIG. 1.
Figure 3:
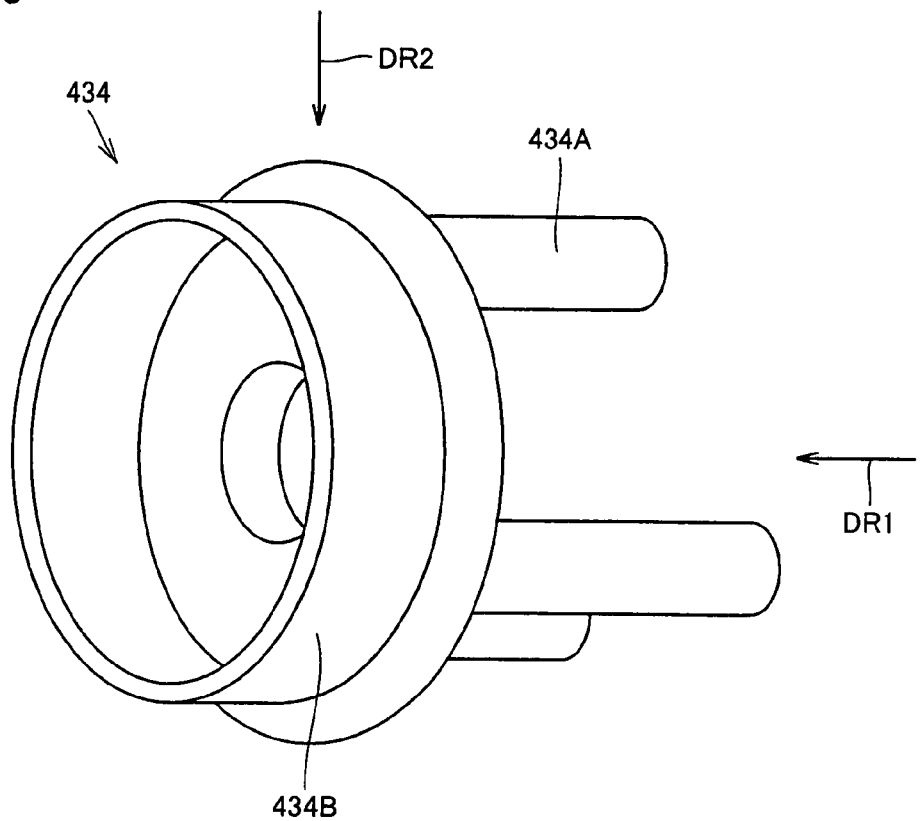
FIG. 3 shows an output portion of a reduction mechanism in the in-wheel motor shown in FIG. 1.

FIG. 2 is a cross sectional view of in-wheel motor 400 shown in FIG. 1, and FIG. 3 shows planetary carrier 434 in in-wheel motor 400. Referring to FIGS. 2 and 3, planetary carrier 434 has a pin 434A supporting pinion gear 432, and a cylindrical projection 434B projecting in the direction indicated by arrow DR1 opposite to pin 434A. In other words, projection 434B is a "cylindrical portion" extending parallel to the direction of a rotary shaft of in-wheel motor 400. Parking lock mechanism 700 is a band-type brake locking projection 434B (the cylindrical portion) in planetary carrier 434.

Figure 4:
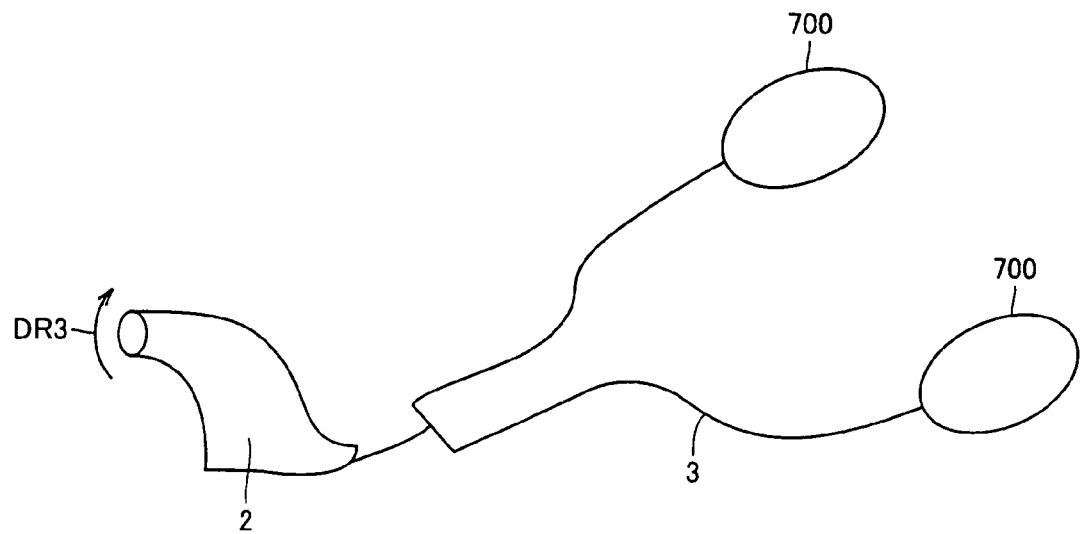
FIG. 4 shows an example of an arrangement for operating a parking lock mechanism in the vehicle in accordance with one embodiment of the present invention.
Figure 5:
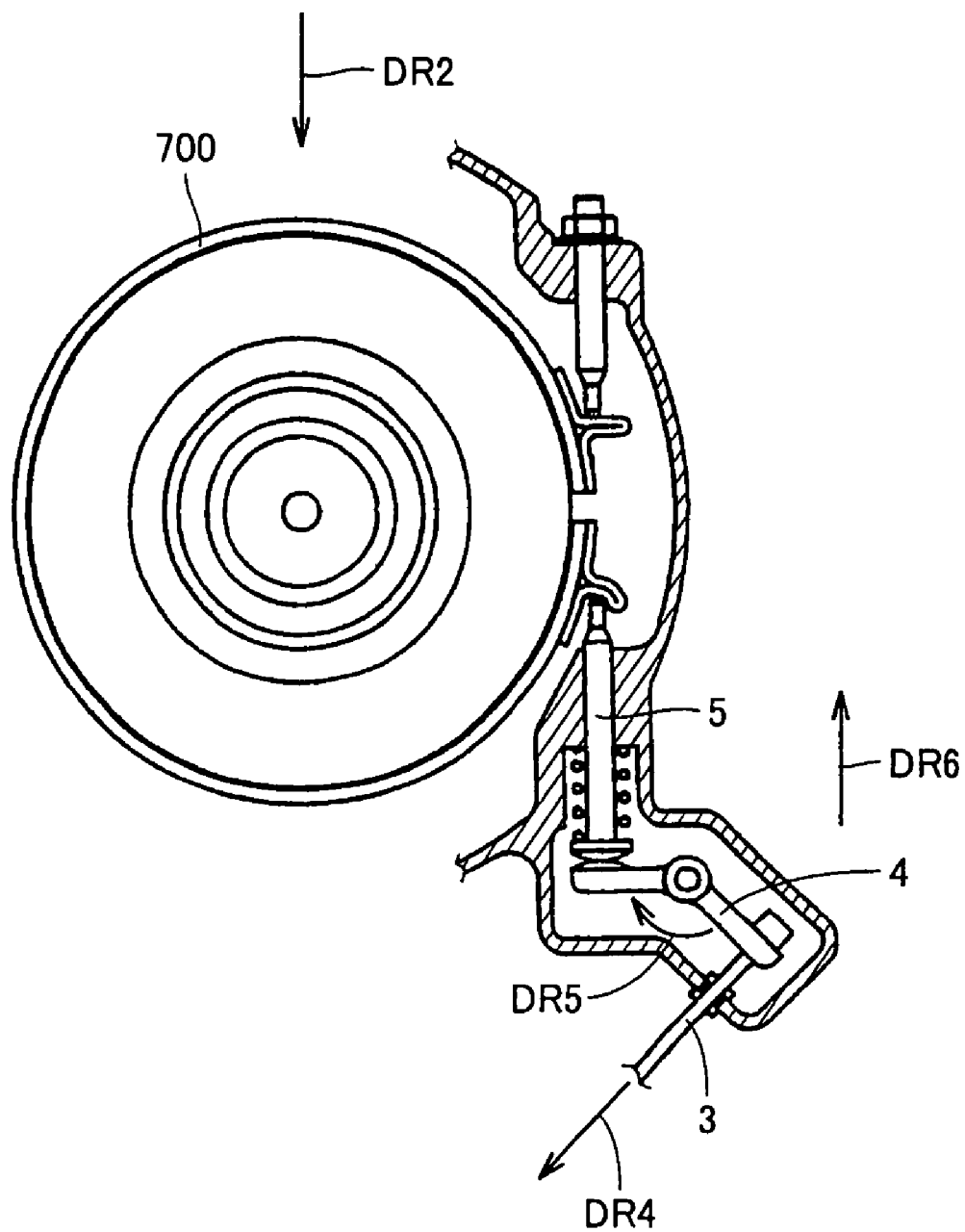
FIG. 5 shows the vicinity of a frictionally engaging portion of the parking lock mechanism shown in FIG. 4.

FIG. 4 shows an example of an arrangement for operating parking lock mechanism 700, and FIG. 5 shows the vicinity of a frictionally engaging portion of parking lock mechanism 700. Referring to FIGS. 4 and 5, the vehicle in accordance with the present embodiment has a brake lever 2, a shift cable 3 connected to brake lever 2, a lever 4 connected to shift cable 3, and a pin 5 in contact with lever 4.

As shown in FIG. 4, the vehicle in accordance with the present embodiment has a plurality of electrically driven wheels 1 described above. Further, parking lock mechanisms 700 in the plurality of electrically driven wheels 1 are each connected to shift cable 3 and operated simultaneously in response to movement of shift cable 3. This allows a plurality of parking lock mechanisms 700 to be operated simultaneously in response to the movement of shift cable 3, locking the plurality of wheels simultaneously.

In the example shown in FIG. 4, to operate parking lock mechanism 700, brake lever 2 is pulled up in a direction indicated by an arrow DR3. Then, shift cable 3 is pulled in a direction indicated by an arrow DR4, and lever 4 rotates in a direction indicated by an arrow DR5, moving pin 5 in a direction indicated by an arrow DR6 (FIG. 5). Thereby, a band included in parking lock mechanism 700 frictionally engages projection 434B in planetary carrier 434, and locks planetary carrier 434. On this occasion, planetary gear 430 serves as the "reduction mechanism" in in-wheel motor 400, and planetary carrier 434 serves as an "output portion" in planetary gear 430. Therefore, with the above arrangement, electrically driven wheel 1 is locked when the vehicle is in a parking state.

The above description will be summarized as follows. Electrically driven wheel 1 in accordance with the present embodiment includes wheel disc 100 and wheel hub 200; in-wheel motor 400 having a portion or whole thereof mounted within wheel disc 100 to drive wheel disc 100 and wheel hub 200 or to be driven by wheel disc 100 and wheel hub 200; brake rotor 500 and brake caliper 600 serving as a "brake mechanism" suppressing the rotation of wheel disc 100 and wheel hub 200 while the vehicle is moving; and parking lock mechanism 700 provided in in-wheel motor 400 separately from the brake mechanism formed of brake rotor 500 and brake caliper 600. Parking lock mechanism 700 is a band-type brake frictionally engaging projection 434B in planetary carrier 434.

With the above arrangement, since parking lock mechanism 700 is provided separately from the brake mechanism formed of brake rotor 500 and brake caliper 600, parking lock mechanism 700 can be operated reliably even when a brake failure occurs. Further, since parking lock mechanism 700 having a relatively large friction area is formed with a simple structure, an increase in the size of a unit can be suppressed.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

INDUSTRIAL APPLICABILITY

As has been described, the present invention is applied to an electrically driven wheel and a vehicle.

The invention claimed is:

1. An electrically driven wheel, comprising:
   a wheel;
   an in-wheel motor having at least a portion thereof mounted within said wheel to drive the wheel or to be driven by the wheel;
   a planetary gear reducing the speed of output of said in-wheel motor;
   a brake mechanism suppressing rotation of said wheel while a vehicle is moving; and
   a parking lock mechanism provided in said in-wheel motor separately from said brake mechanism;
   said planetary gear including a planetary carrier serving as an output portion, and
   said parking lock mechanism fixing said planetary carrier,
   wherein said planetary carrier includes a pin supporting a pinion gear and a projection projecting, with respect to said pin, in a direction of a rotary shaft of said in-wheel motor, and
   said parking lock mechanism fixes said projection.

2. The electrically driven wheel according to claim 1, wherein
   said parking lock mechanism is a band-type brake frictionally engaging said projection.

3. The electrically driven wheel according to claim 1, wherein
   said projection is a cylindrical portion extending parallel to the direction of the rotary shaft of said in-wheel motor.

4. The electrically driven wheel according to claim 1, wherein the planetary carrier is rotatable.

5. An electrically driven wheel, comprising:
   a wheel;
   an in-wheel motor having at least a portion thereof mounted within said wheel to drive the wheel or to be driven by the wheel;
   a planetary gear reducing the speed of output of said in-wheel motor;
   brake means for suppressing rotation of said wheel while a vehicle is moving; and
   a parking lock mechanism provided in said in-wheel motor separately from said brake means;
   said planetary gear including a planetary carrier serving as an output portion, and
   said parking lock mechanism fixing said planetary carrier,
   wherein said planetary carrier includes a pin supporting a pinion gear and a projection projecting, with respect to said pin, in a direction of a rotary shaft of said in-wheel motor, and
   said parking lock mechanism fixes said projection.

6. The electrically driven wheel according to claim 5, wherein
   said parking lock mechanism is a band-type brake frictionally engaging said projection.

7. The electrically driven wheel according to claim 5, wherein
   said projection is a cylindrical portion extending parallel to the direction of the rotary shaft of said in-wheel motor.

8. The electrically driven wheel according to claim 5, wherein the planetary carrier is rotatable.

* * * * *